Figure 3:
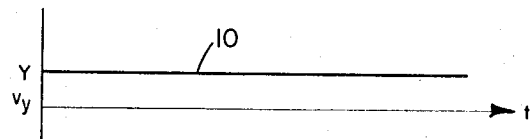
Figure 3:
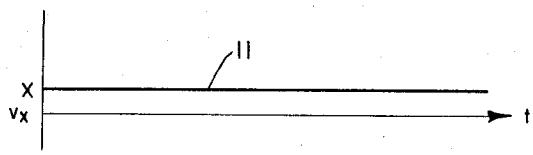
Figure 3:
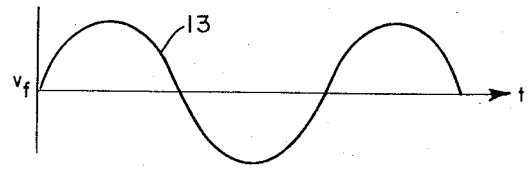
Figure 3:
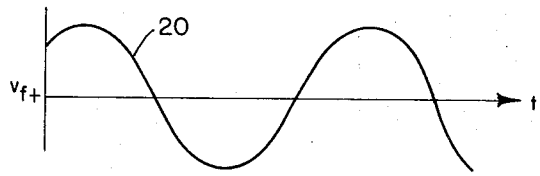
Figure 3:
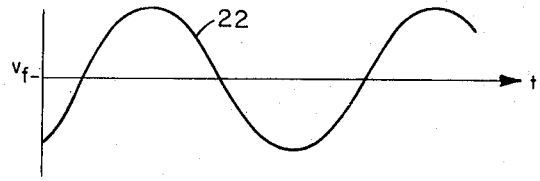
Figure 3:
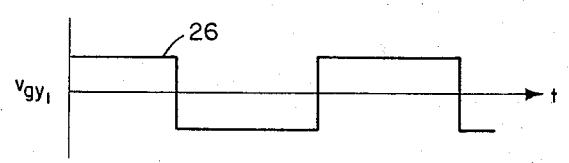
Figure 3:
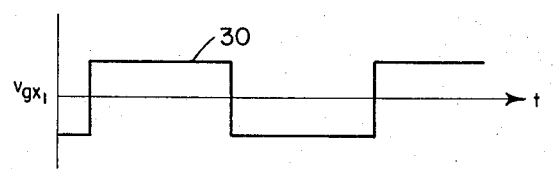

United States Patent

Miller

[15] 3,676,660

[45] July 11, 1972

[54] VECTOR HALF-ANGLE COMPUTER

[72] Inventor: Larry R. Miller, Berkeley, Calif.

[73] Assignee: Hughes Aircraft Company, Culver City, Calif.

[22] Filed: June 23, 1971

[21] Appl. No.: 155,926

[52] U.S. Cl. .............................. 235/186, 235/189, 307/229
[51] Int. Cl. .......................................................... G06g 7/22
[58] Field of Search ................. 235/186, 189, 197, 190, 191, 235/192; 328/165, 166, 167; 307/229

[56] References Cited

UNITED STATES PATENTS

| | | | |
|---|---|---|---|
| 3,058,661 | 10/1962 | Summers | 235/186 X |
| 3,305,674 | 2/1967 | Cook | 235/189 |
| 3,579,268 | 5/1971 | Steiger | 235/186 X |
| 3,584,783 | 6/1971 | Kobori | 235/186 X |
| 3,596,076 | 7/1971 | Zimmerman | 235/189 X |

*Primary Examiner*—Joseph F. Ruggiero
*Attorney*—W. H. MacAllister, Jr. et al.

[57] ABSTRACT

The disclosed analog computer develops from a pair of input signals representative of input quadrature component vectors, a pair of output signals representative of quadrature component vectors of a sum vector having the same magnitude but one-half of the angle of the sum vector of the input quadrature component vectors. Signal generating circuitry generates quadrature gating signals at both a first frequency and a second frequency equal to twice the first frequency. A first informational signal at the second frequency with a phase indicative of the input sum vector angle is developed from the combined output signals from circuits which gate the respective input signals with the second frequency quadrature gating signals. The first informational signal is gated with a phase coherent signal at the first frequency to produce a second informational signal at the first frequency with a phase indicative of one-half of the input sum vector angle. Computer output signals are obtained by gating the second informational signal with the first frequency quadrature gating signals and filtering the resultant gate output signals.

8 Claims, 29 Drawing Figures

Larry R. Miller,
INVENTOR.
BY.
Paul M. Coble
ATTORNEY.

VECTOR HALF-ANGLE COMPUTER

This invention relates generally to electronic analog computers, and more particularly relates to a special purpose analog computing device for calculating from a pair of input signals representative of quadrature component vectors, one-half of the angle of the resultant sum vector, and for providing a pair of output signals representative of the quadrature component vectors of a new sum vector having the same magnitude but one-half of the angle of the aforementioned sum vector.

It is sometimes necessary to perform repetitive mathematical computations on measured values of slowly varying electrical signals. In one such computation the slowly varying electrical signals represent a pair of quadrature component vectors of a sum vector, and it is desired to compute the quadrature component vectors of a new sum vector of the same magnitude as the original sum vector but at an angle equal to one-half that of the original sum vector. Heretofore, carrying out this computation required measuring the amplitude of each original component vector-representing signal, calculating both the magnitude and angle of the resultant sum vector, dividing this angle by two, calculating the relative magnitude of the new component vectors, and solving a quadratic equation relating the magnitudes of the component vectors to the magnitude of the sum vector. Moreover, as the aforementioned vector-representing electrical signals change in value, the aforementioned sequence of calculations must be repeated.

Accordingly, it is an object of the present invention to provide a simple and reliable electronic analog computing device for rapidly and automatically carrying out the aforedescribed computation.

An analog computing device according to the invention develops from a pair of input signals representative of quadrature component vectors, a pair of output signals representative of quadrature component vectors of a sum vector having the same magnitude but one-half of the angle of the sum vector of the quadrature component vectors represented by the input signals. Signal generator circuitry generates first and second gating signals at a first frequency and third and fourth gating signals at a second frequency equal to twice the first frequency. The first and second gating signals are in phase quadrature with one another, the third and fourth gating signals also being in phase quadrature with one another and being phase coherent with the first and second gating signals. First and second gate circuits selectively pass the respective first and second input signals in accordance with the respective third and fourth gating signals.

A first informational signal at the second frequency is developed from the gate circuit output signals, the informational signal having an amplitude proportional to the sum vector magnitude and a phase relative to the third and fourth gating signals indicative of the input sum vector angle. A fifth gating signal at the first frequency and phase coherent with the first informational signal is developed from the first informational signal and applied to a third gate circuit which selectively passes the first informational signal in accordance with the fifth gating signal. A second informational signal at the first frequency is developed from the output signal from the third gate circuit. The second informational signal has an amplitude proportional to the sum vector magnitude and a phase relative the the first and second gating signals indicative of one-half of the input sum vector angle. Fourth and fifth gate circuits selectively pass the second informational signal in accordance with the first and second gating signals, respectively. A pair of filter circuits respectively coupled to the fourth and fifth gating circuits develop the respective device output signals.

Figure 1A:
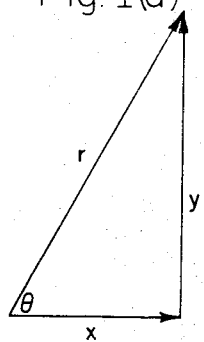
Figure 1B:
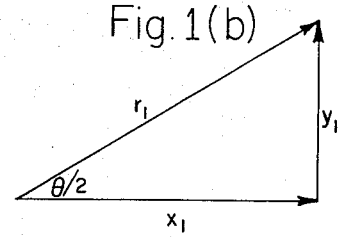
Figure 2:
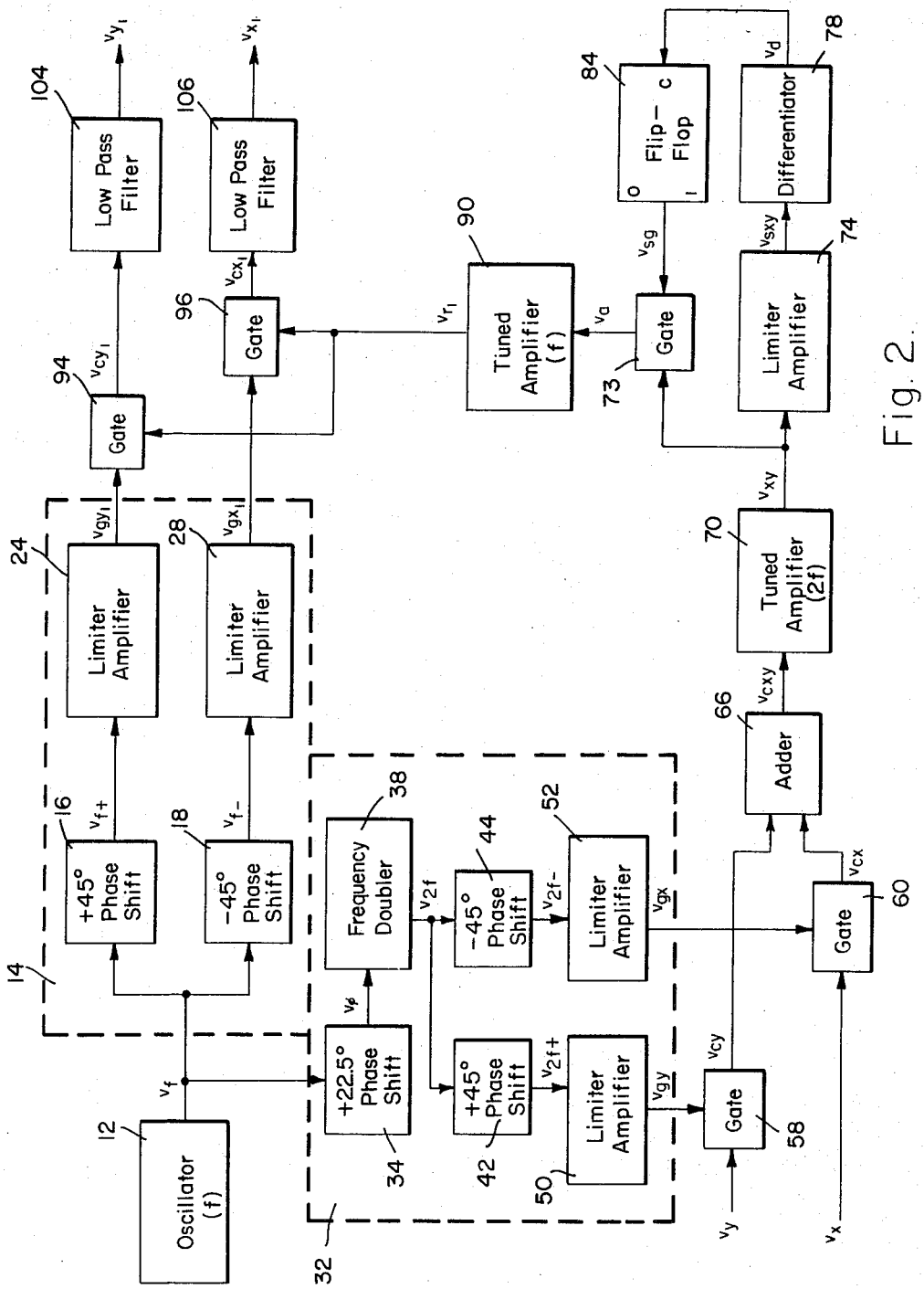
Figure 3:
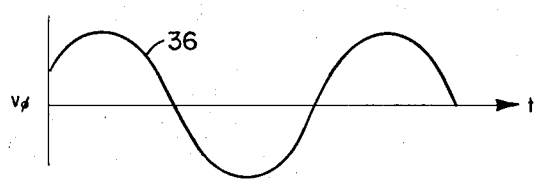
Figure 3:
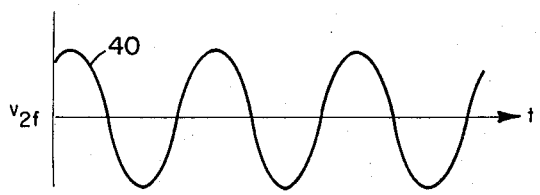
Figure 3:
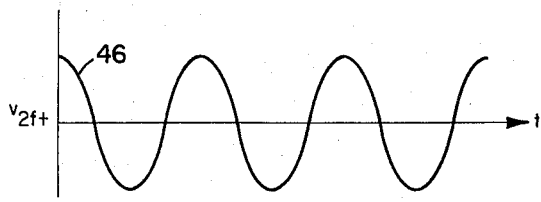
Figure 3:
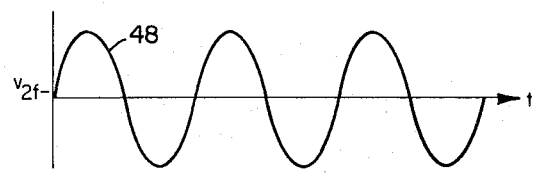
Figure 3:
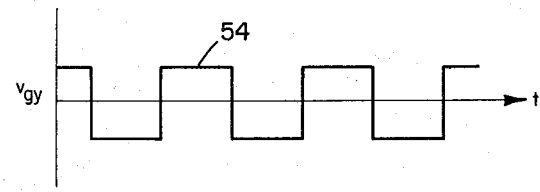
Figure 3:
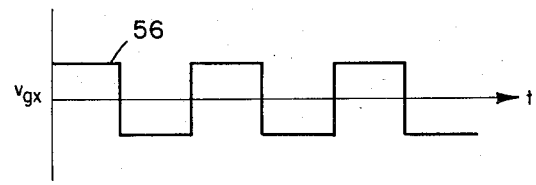
Figure 3:
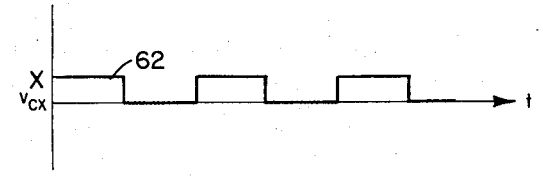
Figure 3:
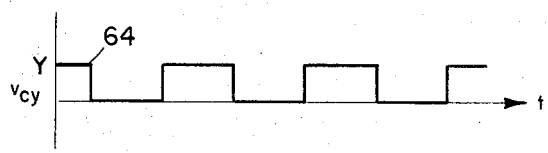
Figure 3:
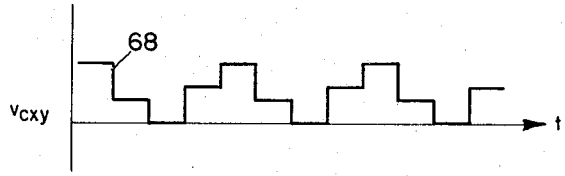
Figure 3:
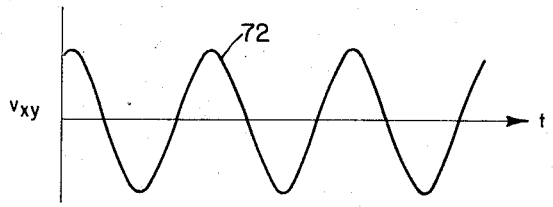
Figure 3:
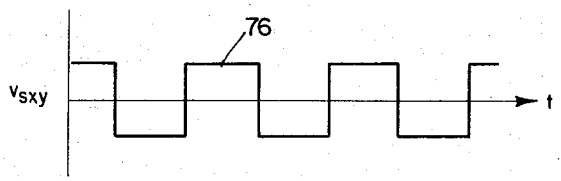
Figure 3:
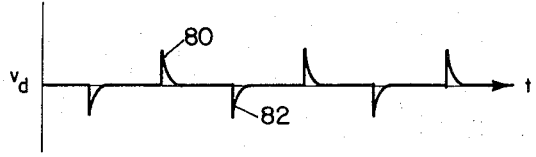
Figure 3:
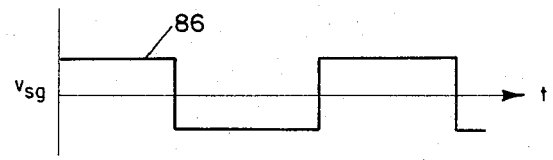
Figure 3:
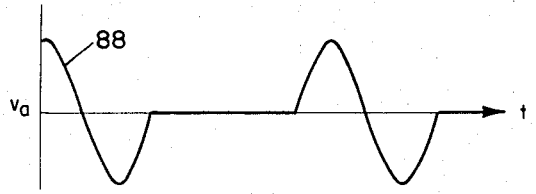
Figure 3:
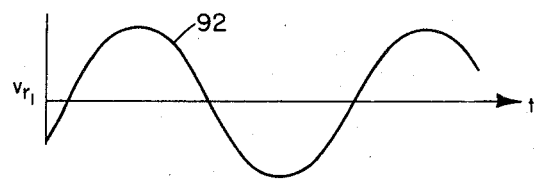
Figure 3:
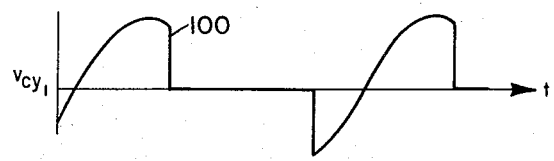
Figure 3:
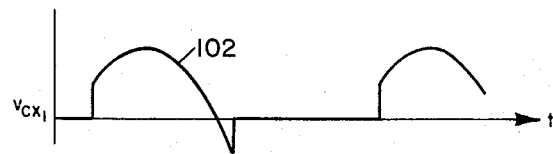
Figure 3:
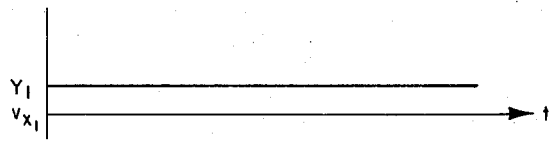
Figure 3:
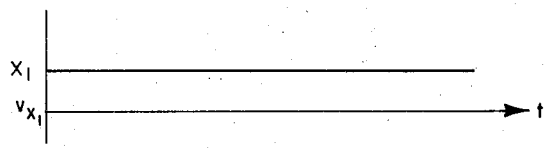

Additional objects, advantages, and characteristic features of the invention will become readily apparent from the following detailed description of a preferred embodiment of the invention when considered in conjunction with the accompanying drawings wherein:

FIGS. 1($a$) and 1($b$) are vector diagrams used in explaining the computation performed by an analog computing device according to the invention;

FIG. 2 is a block diagram illustrating an analog computing device according to he invention; and FIGS. 3($a$)–($z$) are graphs of respective timing waveforms illustrating the voltage at various points in the block diagram of FIG. 2.

Referring to the drawings with greater particularity, the input signals to be processed by the computing device of the invention represent quadrature component vectors $y$ and $x$ of FIG. 1($a$). The input signals are designated $v_y$ and $v_x$ and, as shown by respective waveforms 10 and 11 of FIGS. 3($a$) and 3($b$), may be DC voltages or slowly varying AC voltages of a frequency considerably lower than the operational frequency $f$ of the computing device. The vectors $y$ and $x$ have respective magnitudes Y and X, and thus the voltages $v_y$ and $v_x$ have respective magnitudes Y and X.

As may be seen from FIG. 1($a$), the vector sum of the quadrature component vectors $x$ and $y$ is a vector $r$ disposed at an angle $\theta$ with respect to the vector $x$. The magnitude R and the angle $\theta$ for the sum vector $r$ of FIG. 1($a$) may be determined mathematically from $$R^2 = X^2 + Y^2 \tag{1}$$

and $$\tan\theta = Y/X. \tag{2}$$

As has been mentioned above, it is desired to compute from the quadrature component vectors $x$ and $y$ a pair of new quadrature component vectors $x_1$ and $y_1$ of respective magnitudes $X_1$ and $Y_1$ and such that the vector sum of the component vectors $x_1$ and $y_1$ is a new sum vector $r_1$ having the same magnitude R as the sum vector $r$ but an angle equal to $\theta/2$, i.e. one-half of the angle of the sum vector $r$. The vectors $x_1$, $y_1$ and $r_1$ are shown in FIG. 1($b$) and are mathematically described by $$X_1^2 + Y_1^2 = R^2 \tag{3}$$

and $$Y_1/X_1 = \tan\theta/2. \tag{4}$$

Referring now to FIG. 2, an analog computing device according to the invention may be seen to include an oscillator 12 which generates a master signal $v_f$ at the aforementioned operational frequency $f$, an exemplary value for the frequency $f$ being 500 Hz. The master signal $v_f$, which is illustrated as a sine wave 13 in FIG. 3($c$), functions as the basic operational signal from which gating signals of the appropriate frequency and phase are generated.

The master signal $v_f$ is applied to a first gating signal generator, designated generally by the numeral 14, which generates a pair of quadrature gating signals at the frequency $f$, and which gating signals are used in developing the signals representative of the computed quadrature component vectors $x_1$ and $y_1$. In the specific embodiment of the invention illustrated in FIG. 2, the gating signal generator 14 includes first and second phase shift networks 16 and 18, respectively, to which the master voltage $v_f$ is applied. The network 16 shifts the voltage $v_f$ forwardly in phase by 45°, while the network 18 shifts the voltage $v_f$ backwardly in phase by 45°. The respective phase-shifted output voltages $v_{f+}$ and $v_{f-}$ from the networks 16 and 18, respectively, are shown by the respective waveforms 20 and 22 of FIGS. 3($d$) and 3($e$). The phase-advanced output voltage $v_{f+}$ from the network 16 is applied to a limiter amplifier 24 which produces a square wave gating voltage $v_{ay1}$ at the frequency f and in phase with the voltage $v_{f+}$, as shown by waveform 26 of FIG. 3($f$), for use in developing the output voltage representative of the computed vector component $y_1$. Similarly, the phase-retarded voltage $v_{f-}$ from the network 18 is fed to a limiter amplifier 28 which produces a square wave gating voltage $v_{ax}$ at the frequency f and in phase with the voltage $v_{f-}$, as shown by waveform 30 of FIG. 3($g$), for use in developing the output voltage representative of the computed vector component $x_1$.

The master voltage $v_f$ is also applied to a second gating signal generator, designated generally by the numeral 32, for generating a pair of quadrature gating signals at the frequency $2f$, and which quadrature gating signals are phase coherent with the quadrature gating signals $v_{gy_1}$ and $v_{gx}$ produced by the first gating signal generator 14. In the specific embodiment shown in FIG. 2, the gating signal generator 32 includes a phase shift network 34 to which the master voltage $v_f$ is applied for shifting the voltage $v_f$ forwardly in phase by 22.5°. The phase-shifted output voltage $v11$ from the network 34 is shown by waveform 36 of FIG. 3(h).

The output voltage $v$ from the network 34 is applied to a frequency doubler 38 which develops from the voltage $v$ a voltage $v_{2f}$ at twice the frequency $f$, as shown by waveform 40 of FIG. 3(i). The double frequency voltage $v_{2f}$ is fed to a phase shift network 42 similar to the network 16 which shifts the voltage $v_{2f}$ forwardly in phase by 45°, as well as to a phase shift network 44 similar to the network 18 which shifts the voltage $v_{2f}$ backwardly in phase by 45°. The phase-shifted output voltages $v_{2f+}$ and $v_{2f-}$ from the networks 42 and 44, respectively, are illustrated by the respective waveforms 46 and 48 of FIGS. 3(j) and 3(k). The phase-advanced voltage $v_{2f+}$ from the network 42 is applied to a limiter amplifier 50 which produces a square wave gating voltage $v_{gy}$ at the frequency $2f$ and in phase with the voltage $v_{2f+}$, as shown by waveform 54 of FIG. 3(l), for gating the input voltage representative of the component vector $y$. Similarly, the phase-retarded voltage $v_{2f-}$ from the network 44 is applied to a limiter amplifier 52 which produces a square wave gating voltage $v_{gx}$ at the frequency $2f$ and in phase with the voltage $v_{2f-}$, as shown by waveform 56 of FIG. 3(m), for gating the input voltage representative of the component vector $x$.

The gating voltage $v_{gy}$ is applied to the gating input to a gate circuit 58 to which the input voltage $v_y$ representative of the vector $y$ is applied. Similarly, the gating voltage $v_{gx}$ is applied to the gating input to a gate circuit 60 to which the input voltage $v_x$ representative of the vector $x$ is applied. The gate circuits 58 and 60 pass the associated input voltage $v_y$ or $v_x$ when the gating voltage is at a first level, for example the positive level shown in FIGS. 3(l) and 3(m), and block the associated input voltage $v_y$ or $v_x$ when the gating voltage is at a second level, for example the negative level shown in FIGS. 3(l) and 3(m). Thus, there is provided from the gate circuit 60 a chopped voltage $v_{cx}$ of amplitude X, as shown by waveform 62 of FIG. 3(n), while the gate 58 provides a chopped voltage $v_{cy}$ of amplitude Y, illustrated by waveform 64 of FIG. 3(o), the voltage $v_{cy}$ leading the voltage $v_{cx}$ by 90°.

The chopped voltages $v_{cy}$ and $v_{cx}$ from the gates 58 and 60, respectively, are applied to an adder circuit 66 which algebraically combines the voltages $v_{cy}$ and $v_{cx}$ to produce a composite voltage $v_{cxy}$ shown by the waveform 68 of FIG. 3(p). The voltage $v_{cxy}$ is then amplified and filtered in a tuned amplifier 70, which is tuned to the frequency $2f$, to produce a sinusoidal informational voltage $v_{xy}$ at the frequency $2f$. The informational voltage $v_{xy}$, which is illustrated by the waveform 72 of FIG. 3(q), has an amplitude proportional to the magnitude R of the sum vector $r$ and has a phase $\theta$ with respect to the gating voltage $v_{gx}$ equal to the angle $\theta$ between the sum vector $r$ and the component vector $x$.

The output voltage $v_{xy}$ from the tuned amplifier 70 is applied to a gate circuit 73 as well as to a limiter amplifier 74. The limiter amplifier 74 develops from the sinusoidal informational voltage $v_{xy}$, a square wave voltage $v_{sxy}$, illustrated by the waveform 76 of FIG. 3(r), having the same frequency and phase as the voltage $v_{xy}$. The voltage $v_{sxy}$ is applied to a differentiator circuit 78 which provides a differentiated voltage $v_d$ in the form of positive and negative spike voltages 80 and 82, respectively, of FIG. 3(s) at the level transition times of the square wave voltage $v_{sxy}$.

The differentiated voltage $v_d$, in turn, is applied to the complement input terminal of a flip-flop circuit 84. In a specific exemplary embodiment of the invention the flip-flop 84 is designed to trigger on positive input pulses such as spikes 80 of FIG. 3(s) and has its "0" state output terminal connected to the gating input to the gate circuit 73. The flip-flop circuit 84 functions as a frequency divider and produces a square wave gating voltage $v_{sg}$, illustrated by waveform 86 of FIG. 3(t), at the frequency $f$ and having a phase $\theta/2$ (due to the frequency division) relative to the x-vector gating voltage $v_{gx}$. The gate circuit 73 passes the informational voltage $v_{xy}$ when the gating voltage $v_{sg}$ is at a first level, such as the positive level shown in FIG. 3(t), and blocks the voltage $v_{xy}$ when the gating voltage $v_{sg}$ is at a second level, for example the negative level shown in FIG. 3(t).

Since the signal time delay of the limiter amplifier 74, the differentiator 78, and the flip-flop 84 is negligible for the circuit operational frequencies employed, the gating voltage $v_{sg}$ is synchronized in phase with the informational voltage $v_{xy}$ from the tuned amplifier 70. Thus, the gate 73 passes alternate cycles of the voltage $v_{xy}$, producing a gate output voltage $v_a$ illustrated by waveform 88 of FIG. 3(u). The alternate cycle voltage $v_a$ is amplified and filtered in a tuned amplifier 90, which is tuned to the frequency $f$, producing a sinusoidal informational voltage $v_r$, exemplified by waveform 92 of FIG. 3(v). The informational voltage $v_{r_1}$ is at the same frequency $f$ as the x-vector and y-vector gating voltages $v_{gx}$ and $v_{gy}$, respectively, has an amplitude proportional to the magnitude R of the sum vector $r$, and has a phase $\theta/2$ relative to the x-vector gating voltage $v_{gx}$. Thus, the voltage $v_{r_1}$ is indicative of the magnitude and angle of the new sum vector $r_1$.

In order to develop signals representative of the component vectors $x_1$ and $y_1$ for the sum vector $r_1$, the voltage $v_{r_1}$ is applied to respective input terminals of a pair of gate circuits 94 and 96. The gating voltage $v_{gy_1}$ from the limiter amplifier 24 is applied to the gating input to gate 94, while the gate 96 receives the gating voltage $v_{gx_1}$ from the limiter amplifier 28 on its gating input. The gate 94 passes the $r_1$-vector representing voltage $v_{r_1}$ when the gating voltage $v_{gy_1}$ is at a first level, such as the positive level shown in FIG. 3(f), and blocks the voltage $v_{r_1}$ when the gating voltage $v_{gy_1}$ is at a second level, for example the negative level shown in FIG. 3(f). The gate 94 thus produces from the voltage $v_{r_1}$ a chopped voltage synchronized in phase with the $y_1$-vector gating voltage. Similarly, the gate 96 passes the voltage $v_{r_1}$ when the gating voltage $v_{gx_1}$ is at a first level, such as the positive level shown in FIG. 3(g), and blocks the voltage $v_{r_1}$ when the gating voltage $v_{gx_1}$ is at a second level, such as the negative level shown in FIG. 3(g), producing a chopped voltage $v_{cx_1}$ synchronized in phase with the $x_1$-vector gating voltage. Exemplary waveforms for the voltages $v_{cy_1}$ and $v_{cx_1}$, corresponding to the waveform 92 of FIG. 3(v), are shown by respective waveforms 100 and 102 of FIGS. 3(w) and 3(x).

The voltage $v_{cy_1}$ is applied to a low pass filter 104 having a cutoff frequency considerably lower than the frequency $f$. The filter 104 develops a DC voltage, or a slowly varying AC voltage of a frequency considerably lower than the frequency $f$, of a magnitude proportional to the average value of the voltage $v_{cy_1}$. Thus, as shown in FIG. 3(y), low pass filter 104 provides a DC output voltage $v_{y_1}$ of a magnitude $y_1$. Similarly, the voltage $v_{cx_1}$ is applied to a low pass filter 106 similar to the filter 104 to produce a DC (or slowly varying AC) output voltage $v_{x_1}$, such as shown in FIG. 3(z), having a magnitude $X_1$ proportional to the average value of the voltage $v_{cx_1}$.

The values $Y_1$ and $X_1$ of the respective output voltages $v_{y_1}$ and $v_{x_1}$ represent the magnitude of the quadrature component vectors $y_1$ and $x_1$, respectively, as computed in accordance with Equations (3) and (4). Thus, the device of the invention rapidly and automatically provides output signals representative of the quadrature component vectors of a sum vector having the same magnitude but one-half of the angle of the sum vector of the quadrature component vectors represented by the input signals to the device.

Although the present invention has been shown and described with reference to a particular embodiment, nevertheless various changes and modifications obvious to one skilled in the art to which the invention pertains are deemed to lie within the spirit, scope and contemplation of the invention.

What is claimed is:

1. An analog computing device for providing from first and second input signals representative of input quadrature component vectors, first and second output signals representative of quadrature component vectors of a sum vector having the same magnitude but one-half of the angle of the sum vector of said input quadrature component vectors, said device comprising:

signal generator means for generating first and second gating signals at a first frequency and third and fourth gating signals at a second frequency equal to twice said first frequency, said first and second gating signals being in phase quadrature with one another, said third and fourth gating signals being in phase quadrature with one another and being phase coherent with said first and second gating signals;

a first gate circuit for selectively passing said first input signal in accordance with said third gating signal;

a second gate circuit for selectively passing said second input signal in accordance with said fourth gating signal;

means coupled to said first and second gate circuits for developing from the output signals from said gate circuits a first informational signal at said second frequency and having an amplitude proportional to said sum vector magnitude and a phase relative to said third and fourth gating signals indicative of the angle of the input sum vector;

means for developing from said first informational signal a fifth gating signal at said first frequency and phase coherent with said first informational signal;

a third gate circuit for selectively passing said first informational signal in accordance with said fifth gating signal;

means coupled to said third gate circuit for developing from the output signal from said third gate circuit a second informational signal at said first frequency and having an amplitude proportional to said sum vector magnitude and a phase relative to said first and second gating signals indicative of one-half of said input sum vector angle;

a fourth gate circuit for selectively passing said second informational signal in accordance with said first gating signal;

a fifth gate circuit for selectively passing said second informational signal in accordance with said second gating signal; and first and second filter means respectively coupled to said fourth and fifth gate circuits for developing the respective first and second device output signals.

2. An analog computing device according to claim 1 wherein said signal generator means comprises:

oscillator means for generating a master signal at said first frequency;

first gating signal generator means coupled to said oscillator means for generating said first and second gating signals; and second gating signal generator means coupled to said oscillator means for generating said third and fourth gating signals.

3. An analog computing device according to claim 2 wherein said first gating signal generator means comprises:

a pair of phase shift networks coupled to said oscillator means for respectively advancing and retarding the phase of said master signal by 45°; and a pair of limiter amplifiers coupled to respective ones of said pair of phase shift networks.

4. An analog computing device according to claim 2 wherein said second gating signal generator means comprises:

a phase shift network coupled to said oscillator means for advancing the phase of said master signal by 22.5°; a frequency doubler coupled to said phase shift network;

a pair of phase shift networks coupled to said frequency doubler for respectively advancing and retarding the phase of the output signal from said frequency doubler by 45°; and a pair of limiter amplifiers coupled to respective ones of said pair of phase shift networks.

5. An analog computing device according to claim 1 wherein said means for developing said first informational signal comprises:

adder means for algebraically combining the output signals from said first and second gate circuits; and a tuned amplifier coupled to said adder means and tuned to said second frequency.

6. An analog computing device according to claim 1 wherein said means for developing said fifth gating signal comprises:

a limiter amplifier to which said first informational signal is applied;

a differentiator coupled to said limiter amplifier; and a flip-flop circuit having a complement input terminal coupled to said differentiator and having an output terminal coupled to said third gate circuit.

7. An analog computing device according to claim 1 wherein said means for developing said second informational signal comprises a tuned amplifier tuned to said first frequency.

8. An analog computing device according to claim 1 wherein each of said first and second filter means comprises a low pass filter having a cutoff frequency substantially lower than said first frequency.

* * * * *